United States Patent [19]

Ruggiero et al.

[11] 3,930,889
[45] Jan. 6, 1976

[54] MULTIPLE SOURCE BATTERY-POWERED APPARATUS

[75] Inventors: George William Ruggiero, Watertown; Robert Myrick Kelly, Burlington; Eliashiv Mazor, Allston, all of Mass.

[73] Assignee: Bell & Howell Company, Chicago, Ill.

[22] Filed: July 22, 1974

[21] Appl. No.: 490,895

[52] U.S. Cl................................ 136/166; 136/173
[51] Int. Cl.²........................................... H01M 2/02
[58] Field of Search............................ 136/173, 166

[56] References Cited
UNITED STATES PATENTS

| | | | |
|---|---|---|---|
| 3,220,888 | 11/1965 | Moore et al. | 136/173 |
| 3,506,902 | 4/1970 | Sullivan | 136/173 |
| 3,611,568 | 10/1971 | Alexander et al. | 136/173 |

*Primary Examiner*—Donald L. Walton
*Attorney, Agent, or Firm*—Alfred H. Rosen; Frank A. Steinhilper

[57] ABSTRACT

In apparatus powered by electric batteries (e.g.: a paging receiver) having a battery compartment including means to couple the battery in it with a battery charger, the negative (−) charging contact is located at a position nearer to one end of the battery compartment than to the opposite end. A rechargeable battery (e.g.: Ni Cad) has a band of its insulated cover removed at a corresponding position so that the negative charging contact can touch the underlying portion of the battery container, and through that connection the charging circuit can be closed. The charging circuit cannot be closed if the battery is inserted with its polarity reversed. When a non-rechargeable battery is installed the recharging-circuit contact mates with a part of the insulation cover of the battery and the charging circuit cannot be closed. In one disclosed embodiment of the invention, if either battery is installed with its polarity reversed, the energizing circuit from the battery to the radio apparatus will not close.

8 Claims, 12 Drawing Figures

MULTIPLE SOURCE BATTERY-POWERED APPARATUS

BACKGROUND OF THE INVENTION

For battery-powered radio apparatus, such as hand-held "walkie-talkie" transmitters and receivers, and relatively smaller-sized paging receivers intended to be carried on the clothing of a user, there are now available both rechargeable and non-rechargeable batteries or electric energy cells in similar sizes and configurations, giving a user the choice which type of battery to use in a given apparatus. To provide the user with added convenience, housings, of such apparatus have been fitted with exterior contacts for mating with a battery charger, and within the battery compartment of the housing these contacts are coupled to a battery when the latter is installed therein, so that the battery can be recharged without removing it from the battery compartment of the apparatus. In apparatus which can accept and use either type of battery in the same battery compartment, this is not an unmixed blessing. The possibility that a user who has installed a non-rechargeable battery might inadvertently couple the apparatus to a battery charger presents a real danger in that the attempt to recharge a mercury battery, for example, could cause the battery to explode. Care must also be exercised to avoid attempting to charge a rechargeable battery in the reverse-polarity direction. In the case of a nickel-cadmium (Ni Cad) battery, reverse charging can irretrievably ruin the battery.

GENERAL DESCRIPTION OF THE INVENTION

The present invention provides recharge capability for a rechargeable battery which will be rendered inoperative if a non-rechargeable battery is substituted for a rechargeable battery, the latter being specially fitted to cooperate with recharge contact means that are incorporated in a battery compartment. Simultaneously the invention provides that installation of a rechargeable battery with polarity reversed from the correct polarity will also render inoperative the recharge provisions of the invention. In a further aspect, the invention provides that installation of either type of battery with polarity reversed will fail to energize the apparatus, thereby giving the further advantage of reverse-polarity protection in battery-powered apparatus without requiring any special provision to that end within the radio apparatus itself.

DETAILED DESCRIPTION OF THE DRAWINGS

FIGS. 1 to 10, inclusive, relate to a battery utilization system which provides reverse-polarity protection for the electrical circuit or circuits intended to be energized by the battery. For convenience, this system will be referred to herein as "System A." FIGS. 11 and 12 relate to a battery utilization system, herein referred to as "System B", which does not provide such reverse-polarity protection. Both System A and System B will accept and use, interchangeably, a non-rechargeable mercury battery, or a rechargeable nickel-cadmium (Ni Cad) battery, in accordance with the invention; that is to say, the holder for the battery has means to recharge a Ni-Cad battery when the latter is installed therein with proper polarity for energizing the electrical circuit or circuits connected to it, and when alternatively a mercury battery is installed in the holder the recharging means will not be connected to it, whether or not the mercury battery is installed with the correct polarity.

Figure 1:
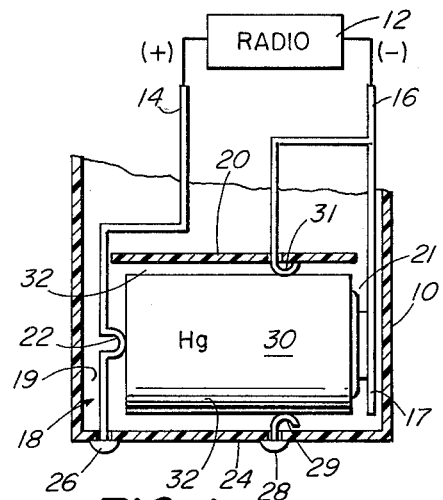
FIG. 1 is a partial view of radio apparatus with battery recharging means, having a non-rechargeable battery installed in its battery compartment.
Figure 2:
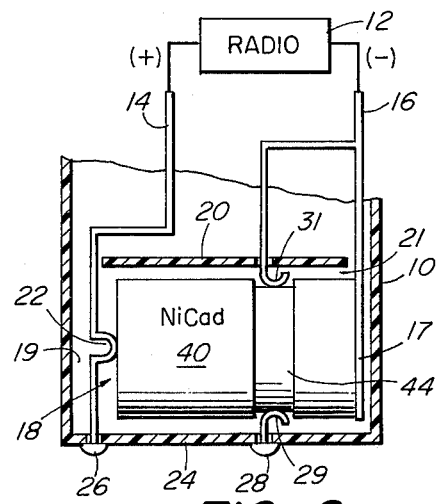
FIG. 2 is a partial view like FIG. 1, with a rechargeable battery installed in the battery compartment.

FIGS. 1 and 2 show partly schematically that portion of the case 10 of a battery-powered radio apparatus that is reserved to house the battery. The radio apparatus itself is schematically illustrated as a block 12, having a positive (+) terminal 14 and a negative (−) terminal 16. The battery compartment 18 is separated from the remainder of the case by a partition 20. The positive terminal 14 extends from the radio apparatus through the partition 20 into a first end 19 of the battery compartment 18, where it is fitted with spring-contact means 22, and through an end outer wall 24 of the case to a positive recharging contact 26. The negative terminal 16 extends from the radio apparatus through the partition 20 into a second end 21 of the battery compartment to a flat remote contact 17, for contact with the negative terminal of an appropriately configured battery when the latter is present in the battery compartment. A negative recharging contact 28 is located on the outer side of the end wall 24, nearer to the negative end 21 of the battery compartment than to the positive end 19 thereof, and this contact is connected through the wall 24 to a recharging spring contact 29 within the battery compartment. A companion spring contact 31 is located within the battery compartment directly opposite the recharging spring contact 29, and is connected to the radio apparatus negative terminal 16.

Figure 3:
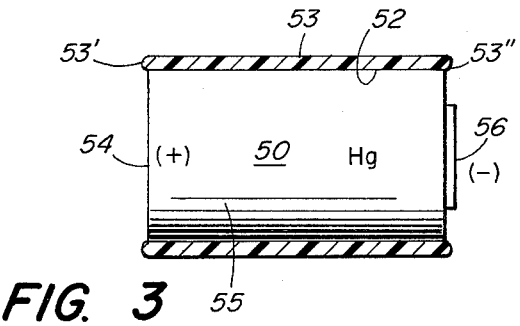
FIGS. 3 and 4 are respective side views, partly in section, of non-rechargeable batteries.
Figure 4:
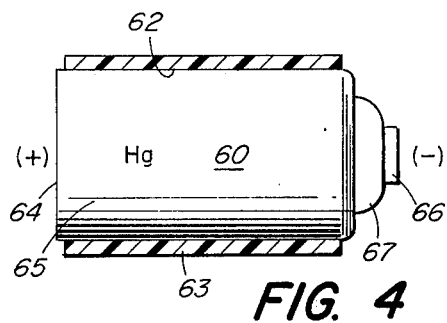

FIG. 1 shows a mercury battery 30 installed with correct polarity in the battery compartment 18. Two configurations 50, 60, of a mercury battery are shown in FIGS. 3 and 4, respectively, and will be discussed in detail below in connection with the reverse-polarity protection feature of System A. The outer side surface 32 of the mercury battery 30 is in either configuration insulated (See FIGS. 3, 4) substantially throughout its length, so that the negative recharging spring contact 29 cannot make electrical contact to this battery, whether or not the battery is installed with correct polarity. Accordingly, when a mercury battery 30 is installed in the battery compartment 18, the recharging circuit cannot be closed, and the recharging contact means 26, 28, 29 are inoperative.

FIG. 2 shows a Ni-Cad battery 40 installed with correct polarity in the battery compartment 18. FIG. 15 illustrates this battery in greater detail. The negative terminal of this battery is provided by the usually cylindrical metal container 41, and the positive terminal 42 is centrally located in the open end of the container, insulated from it. An insulating cover 43 covers all of the outer surface of the container 41, including the end 45 remote from the positive terminal, except for a circumferential band 44, nearer to the remote end than to the positive terminal, that is exposed and intended for negative terminal electrical contact. This band 44 is so located that when the battery 40 is installed in the battery compartment 18 with correct polarity the negative recharging spring contact 29 and the radio apparatus negative spring contact 31 will both make contact with it. The flat remote contact 17 of the negative terminal 16 that is located in the battery compartment is insulated from the end 45 of the battery by the insulating cover 43, so that the only negative contact of the radio apparatus 10 with the Ni-Cad battery is through the negative (−) spring contact 31. The positive terminal 42 of the Ni-Cad battery makes contact with the positive terminal spring contact 22 of the radio apparatus, so that the Ni-Cad battery 40 can furnish energy to the radio apparatus when installed with correct polarity. Simultaneously, the Ni-Cad battery can be recharged via the recharging contacts 26 and 28 when it is installed with correct polarity in the battery compartment 18, and the radio apparatus 12 can be operated directly from a recharging device (not shown) over the circuit including the conductive path from the (−) recharging spring contact 29 to the negative terminal spring contact 31 through the exposed band 44 of the battery container 41.

Figure 10:
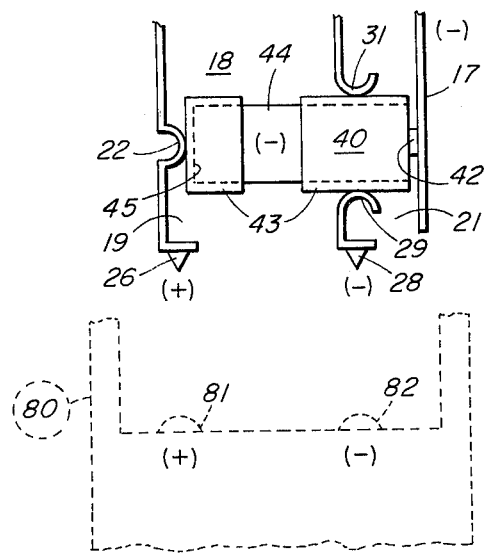

FIG. 10 is a partial view, partially schematic, of FIG. 2, showing the battery 40 installed in the compartment 18 with polarity reversed, or incorrect. The positive terminal 42 is adjacent the (−) terminal flat contact 17 of the radio apparatus 12, and the remote end 45 of the battery is adjacent the (+) terminal 22 of the radio apparatus. The battery negative terminal band 44 is now nearer to the (+) terminal end 19 of the battery compartment than to the negative terminal end 21, and it is no longer in a position to make electrical contact with the recharging contact 29 or the apparatus (−) spring contact 31. The insulation 43 covering the end 45 of the battery container 41 prevents electrical contact with the (+) apparatus terminal 22. Thus the Ni-Cad battery, when installed with polarity reversed from correct polarity, can neither supply energy to the radio apparatus 12, nor accept charging current via the recharging contacts 26, 28. The charging circuit cannot be closed, and the Ni-Cad battery is thus also protected against being reverse-charged.

Figure 6:
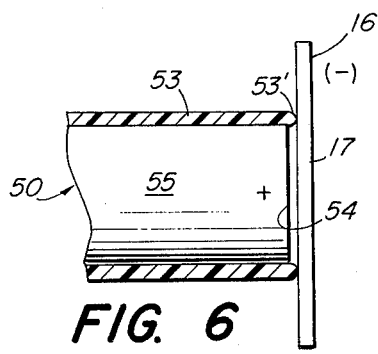
FIGS. 6 to 10, inclusive, are respective schematic illustrations of reverse-polarity features of one embodiment of the invention.

The mercury battery 50 shown in FIG. 3 has an insulating cover or sleeve 53 which extends not only over the entire side surface 52 of the battery container but also beyond the ends of the battery container 55 as is shown at 53' and 53''. The sleeve extension at 53' surrounds the periphery of the positive terminal 54, which in this configuration is the flat closed end of the battery container 55. The negative terminal 56 is centrally located in the opposite end of the battery, insulated from the container 55, and projects from the container beyond the sleeve extension 53''. When this battery 50 is installed with correct polarity in the battery compartment 18, (as is illustrated in FIG. 1) the positive battery terminal 54 can make contact with the (+) apparatus spring contact 22, and the negative battery terminal 56 can make contact with the flat (−) apparatus terminal 17. On the other hand, if this battery 50 is installed in the battery compartments with polarity reversed, as is shown in FIG. 6, the extension 53' of the sleeve 53 which surrounds the positive battery terminal 54 will hold that terminal away from the flat (−) apparatus contact 17, and the battery will be prevented from energizing the radio apparatus with reversed polarity.

FIG. 4 shows a well-known commercial configuration 60 of a mercury battery, in which the container 65 forming the positive battery terminal is covered at its sides 62 with an insulating sleeve 63 which does not reach entirely to the ends of the side walls. The closed end 64 of the container and a small portion of the side walls immediately bounding the end wall provide the positive battery terminal. The negative battery terminal 66 is centrally located in the opposite end of the battery, surrounded by an electrically insulating collar 67 which itself extends forward of the container 65, and the negative terminal extends still further forward of the collar, relative to the open end of the container. It will be obvious that the mercury battery 60 can be installed in the compartment 18, as one version of the exemplary battery 30, and it will render charging means 26, 28, 29 inoperative when so installed, whether or not the polarity is correct.

Figure 8:
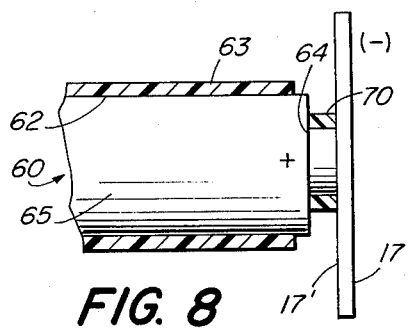
Figure 7:
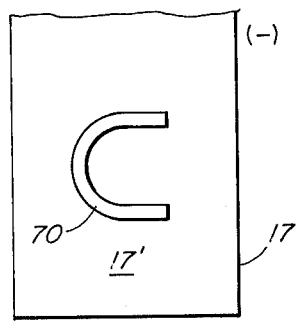
Figure 9:
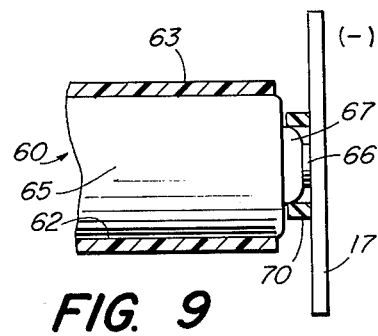

FIGS. 7, 8 and 9 show a modification of the flat (−) apparatus terminal 17 that will provide reverse-polarity protection for the battery-powered apparatus 12 when the battery configuration 60 of FIG. 4 is used. A generally U-shaped boss 70, made of electrically-insulating material, is provided on the surface 17' of the flat terminal 17 confronting the battery. The space between the arms of the boss is selected to admit the battery insulating collar 67 between them, and the height of the boss (projecting from the terminal surface 17') is so selected that when the negative terminal 66 of the battery is presented to the flat (−) apparatus terminal 17 contact will be made between these two terminals, as is shown in FIG. 9. The flat positive battery contact 64, on the other hand, cannot reach the flat negative apparatus terminal 17 when the battery is installed with polarity reversed, and in that event the battery cannot supply energy to the apparatus 12. The U-shaped boss 70 thus serves the same purpose as the sleeve extension 53' in FIG. 3. The boss 70 is preferably oriented with its open end toward the access opening to the battery compartment 18, as FIG. 7 illustrates, so that the battery 60 can be installed without unnecessary difficulty.

Figure 11:
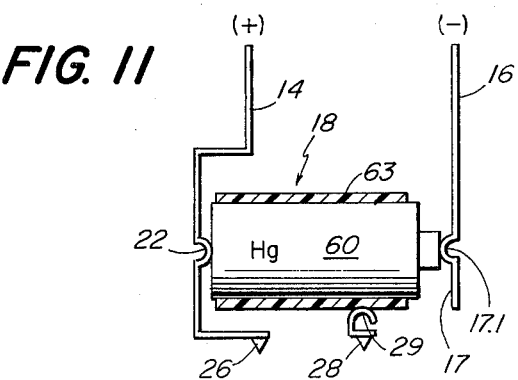
FIGS. 11 and 12 are respective schematic illustrations of another embodiment of the invention.
Figure 12:
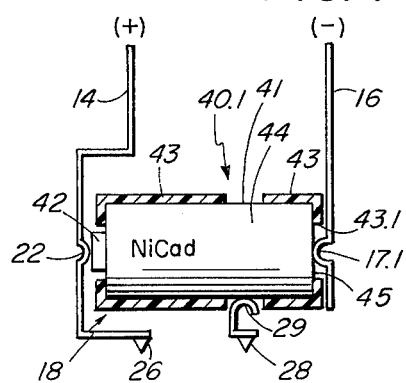

In System B, as illustrated in FIGS. 11 and 12, parts that are common with System A bear the same reference characters. To simplify the illustrations, parts of the housing 10, 20 and 24 have been omitted. It will be seen, also, that System B is simpler than System A in that the radio apparatus negative spring contact 31 has been omitted from System B.

In FIG. 11, a mercury battery 60 as shown in FIG. 4 is installed in the battery compartment 18 between the spring contact 22 of the radio apparatus positive (+) terminal 14 and a second spring contact 17.1 provided on the radio apparatus negative (−) terminal 17. While the charging circuit contacts 26, 28 and 29 cannot be rendered operative by the mercury battery 60, the battery will provide energy to the radio apparatus if it is installed in System B with polarity reversed. Since radio apparatus intended to operate from a low voltage supply, for example, 1.2 volts or 1.5 volts, may inherently be capable of tolerating reverse polarity without damage, or can be acceptable cost incorporate protection against damage from operating voltage applied with polarity reversed, the arrangement of System B is acceptable for such apparatus.

Figure 5:
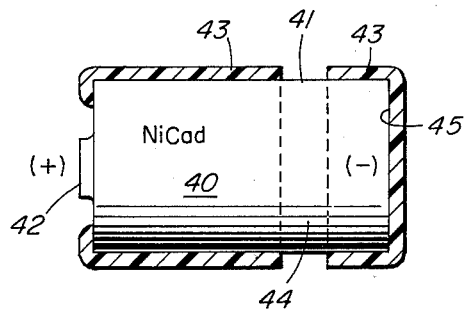
FIG. 5 is a side view, partly in section, of a rechargeable battery incorporating the invention.

In FIG. 12, a Ni-Cad battery 40.1, which is similar in all respects to the battery 40 shown in FIG. 5 except that a portion of the insulating cover 43 has been removed to provide a window 43.1 at the end 45 of the container 41, is installed in the battery compartment 18, with the negative terminal end 45 making electrical contact to the apparatus negative terminal spring contact 17.1. As in FIG. 2, the battery positive terminal 42 makes electrical contact to the apparatus positive terminal spring contact 22. A battery charging circuit can be completed via the charging circuit contacts 26, 28, 29, and the apparatus can be operated from a charger via these contacts through the battery container end 45 and spring contact 17.1 taking the place of omitted spring contact 31. If the Ni Cad battery is installed in the compartment 18 with polarity reversed, it will not render the charging circuit 26, 28, 29 operative, thus preserving the feature of protecting against reverse-charging the Ni-Cad battery, but the battery will energize apparatus connected to the apparatus terminals 14, 16, such as the radio apparatus 12.

To recharge a battery that is installed in the compartment 18, any suitable recharger holder may be provided. An example of such a holder 80 is indicated in dashed lines at FIG. 10. The holder has a provision to receive the battery-operated apparatus in a space provided with charger (+) terminal 81 and (−) terminal 82 located to mate with the apparatus recharging contacts 26 and 28, respectively.

We claim:

1. An electric battery in an electrically-conductive case forming one terminal for the battery, said case having a side surface between first and second ends and enclosing one of said ends, an electrically-insulating cover over said side surface and said one end, and an aperture in said cover over said side surface located nearer to one of said ends than to the other for giving via said side surface the only contact access to said one terminal, a second battery terminal being located in the other of said ends.

2. A battery according to claim 1 in which said case is cylindrical and said cover is in two parts with an annular space between them providing said aperture.

3. A battery according to claim 2 in which said cover overlies the periphery of the other of said ends.

4. In a battery-powered electrical apparatus for use alternatively with, either a rechargeable battery having a terminal for a first polarity at one end and a charging terminal for a second polarity positioned on a side surface of said battery, or a non-rechargeable battery having a terminal for said first polarity at one end and a terminal for said second polarity at the other end; a case for the apparatus, a battery chamber in said case for receiving a battery, first battery contact means for said first polarity located at a first position at one end in said chamber, second battery contact means for said second polarity located in a second position at the opposite end in said chamber, third battery contact means for said second polarity located in a third position between said ends in said chamber for making contact with said terminal for said second polarity of said rechargeable battery when the latter is installed in said chamber, said second and third battery contact means being connected to each other within said case, first and second battery charging contacts outside said chamber, a connection from said first charging contact to said first battery contact means, fourth battery contact means in said chamber adjoining said third battery contact means, for making contact with said charging terminal of said rechargeable battery when the latter is installed in said chamber, and a connection from said second battery charging contact to said fourth battery contact means.

5. Apparatus according to claim 4 in which said second battery contact means is a flat plate.

6. Apparatus according to claim 5 including an insulating projection on said plate.

7. In a battery-powered electrical apparatus, a battery chamber having first and second confronting ends and side wall means between them for receiving a battery of similar proportions, first battery contact means for a first polarity located at said first end in said chamber, second battery contact means for a second polarity located at a side wall in said chamber nearer to one of said ends than to the other, third battery contact means for said second polarity located at said second end in said chamber, said second and third battery contact means being connected to each other, first and second battery-charging contacts outside said chamber, a connection from said first charging contact to said first battery contact means, a fourth battery contact means located at a side wall in said chamber opposite to said second battery contact means, and a connection from said second charging contact to said fourth battery contact means, for receiving optionally in said chamber a rechargeable battery having a first terminal at one end located to mate with said first battery contact means and a second circumferential terminal at one side nearer to one end than to the other to mate with said second and fourth battery contact means and to connect same together with said second charging contact, or a non-rechargeable battery having respective terminals at both ends located to mate respectively with said first and third battery contact means respectively.

8. In combination with an apparatus according to claim 7, a holder for the apparatus, said holder having a socket to receive the apparatus in a desired position, said holder including charging means for a rechargeable battery when present in the apparatus, said charging means having first and second charging contacts located to register respectively with the first and second charging contacts of said apparatus when the apparatus is present in the holder, whereby, when a rechargeable battery is present in the apparatus said battery can be recharged while the apparatus is in the holder, and when a non-rechargeable battery is present in the apparatus said charging means will be inoperative while the apparatus is in the holder.

* * * * *